(12) United States Patent
Nims et al.

(10) Patent No.: US 6,198,174 B1
(45) Date of Patent: Mar. 6, 2001

(54) MICROTURBINE POWER GENERATING SYSTEM

(75) Inventors: Robert A. Nims, Rancho Palos Verdes; Patrick Lee O'Brien, Torrance; Terrence Emerson, Hermosa Beach, all of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/493,644

(22) Filed: Jan. 28, 2000

Related U.S. Application Data

(62) Division of application No. 08/995,462, filed on Dec. 20, 1997.

(51) Int. Cl.[7] .................................................. F02C 7/00
(52) U.S. Cl. ........................................ 290/52; 60/39.511
(58) Field of Search .................................... 290/52, 40 A, 290/40 B, 40 C, 40 D; 60/39.511, 262, 39.5, 39.512

(56) References Cited

U.S. PATENT DOCUMENTS

| | | | |
|---|---|---|---|
| 4,052,843 | * 10/1977 | Takizawa | 60/39.28 R |
| 4,213,297 | * 7/1980 | Forster et al. | 60/39.51 R |
| 4,580,406 | * 4/1986 | Nims | 62/87 |
| 4,827,170 | * 5/1989 | Kawamura et al. | 310/156 |
| 5,406,797 | * 4/1995 | Kawamura | 60/608 |
| 5,855,112 | 1/1999 | Bannai | 60/39.511 |
| 6,032,459 | * 3/2000 | Skowronski | 60/39.511 |
| 6,093,975 | * 7/2000 | Peticolas | 290/52 |

* cited by examiner

*Primary Examiner*—Nicholas Ponomarenko
(74) *Attorney, Agent, or Firm*—John R. Rafter; Felix L. Fischer; Ephraim Starr

(57) ABSTRACT

A microturbine power generation system includes an electrical generator, a turbine and a compressor intermediate the generator and the turbine. The turbine, compressor and electrical generator are secured together by a tieshaft. The tieshaft is prestressed such that faces of the turbine, electrical generator and compressor maintain contact during high-speed, high-temperature operation of the system.

23 Claims, 2 Drawing Sheets

MICROTURBINE POWER GENERATING SYSTEM

CROSS-REFERENCE TO RELATED APPLICATIONS

This application is a divisional application that relates to and claims priority from non-provisional application Ser. No. 08/995,462, filed on Dec. 20, 1997, which is incorporated herein by reference and which is commonly assigned with the present application.

BACKGROUND OF THE INVENTION

The present invention relates generally to microturbine power generating systems. More specifically, the present invention relates to modular, distributed power generating units.

The United States Electric Power Research Institute (EPRI) which is the uniform research facility for domestic electric utilities, predicts that up to 40% of all new generation could be provided by distributed generators by the year 2006. In many parts of the world, the lack of electric infrastructure (transmission and distribution lines) will greatly expedite the commercialization of distributed generation technologies since central plants not only cost more per kilowatt, but also must have expensive infrastructure installed to deliver the product to the consumer.

Small, multi-fuel, modular distributed microturbine generation units could help alleviate current afternoon "brownouts" and "blackouts" prevalent in many parts of the world. A simple, single moving part concept would allow for low technical skill maintenance and low overall cost would allow for widespread purchase in those parts of the world where capital is sparse. In addition, given the United States emphasis on electric deregulation and the world trend in this direction, consumers of electricity would have not only the right to choose the correct method of electric service, but also a new cost effective choice from which to chose. U.S. Pat. No. 4,754,607, which is assigned to the assignee of the present invention, discloses a microturbine power generating system suitable for cogeneration applications.

Yet to make these units commercially attractive to consumers, improvements are needed in areas such as increasing fuel-efficiency, reducing size and weight, and lowering thermal signature, noise, maintenance and cost penalties.

SUMMARY OF THE INVENTION

The invention can be regarded as a microturbine power generating system including an electrical generator and a turbine that can be rotated by a single shaft. Hot, expanding gases resulting from the combustion are expanded through a turbine, and the resulting turbine power generated by the turbine is used for powering the electrical generator. The microturbine power generating system further includes a single shaft connecting the turbine and electrical generator in prestressed relation to allow the electrical generator to rotate in unison with the turbine and to thereby use the mechanical energy extracted by the turbine to produce power.

Electricity production of the system is especially flexible. A variable-frequency ac output produced by the electrical generator can be rectified to dc power. The dc power can then be chopped by an inverter to produce ac power having a selected frequency.

DESCRIPTION OF THE PREFERRED EMBODIMENT

Figure 1:
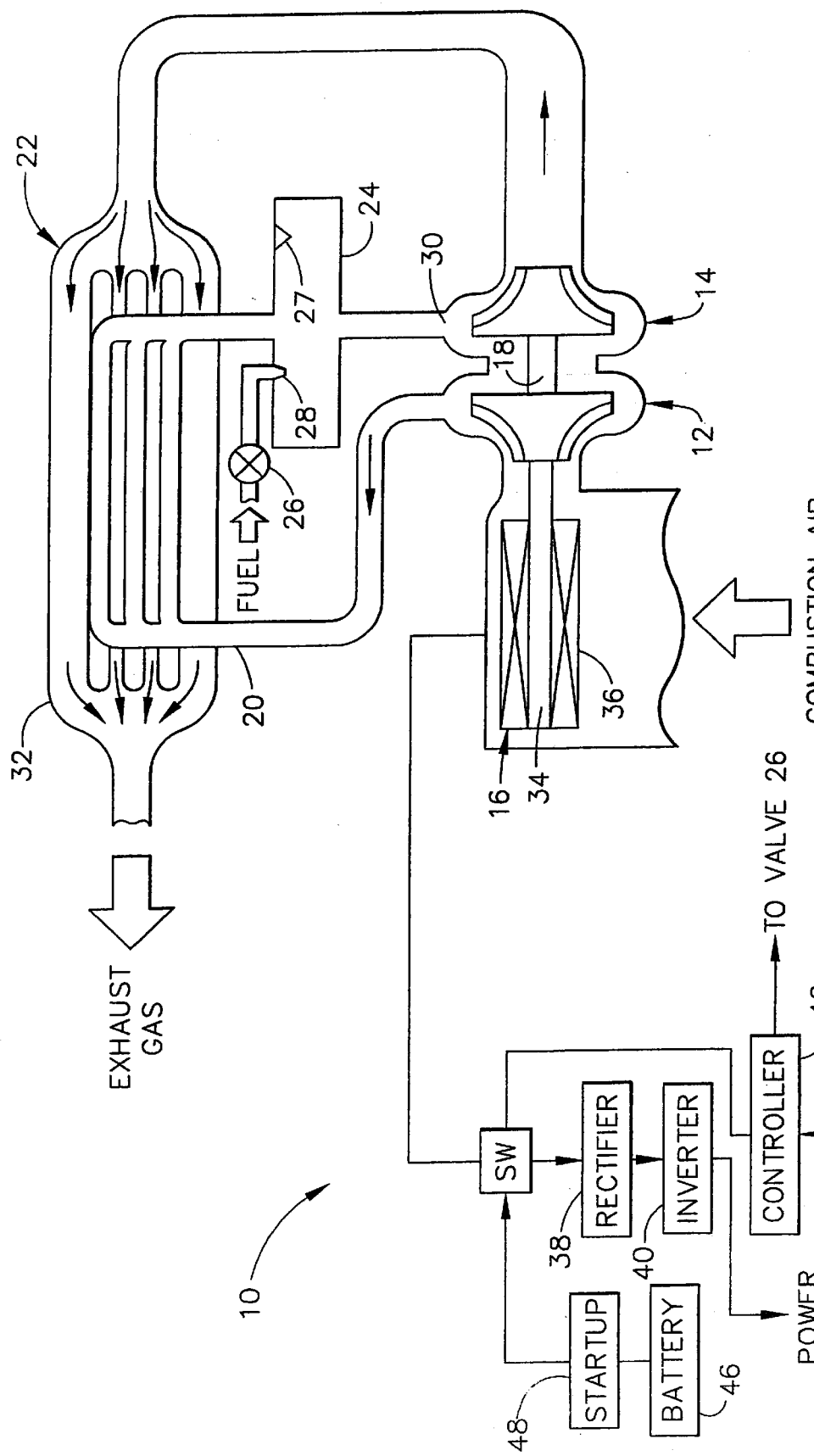
FIG. 1 is a block diagram of a power generating system according to the present invention.

Referring to FIG. 1, a power generating system 10 according to the present invention is illustrated. The power generating system 10 includes a compressor 12, a turbine 14 and an electrical generator 16. The electrical generator 16 is cantilevered from the compressor 12. The compressor 12, the turbine 14 and the electrical generator 16 can be rotated by a single shaft 18. Although the compressor 12, turbine 14 and electrical generator 16 can be mounted to separate shafts, the use of a single common shaft 18 for rotating the compressor 12, the turbine 14 and the electrical generator 16 adds to the compactness and reliability of the power generating system 10.

Figure 2:
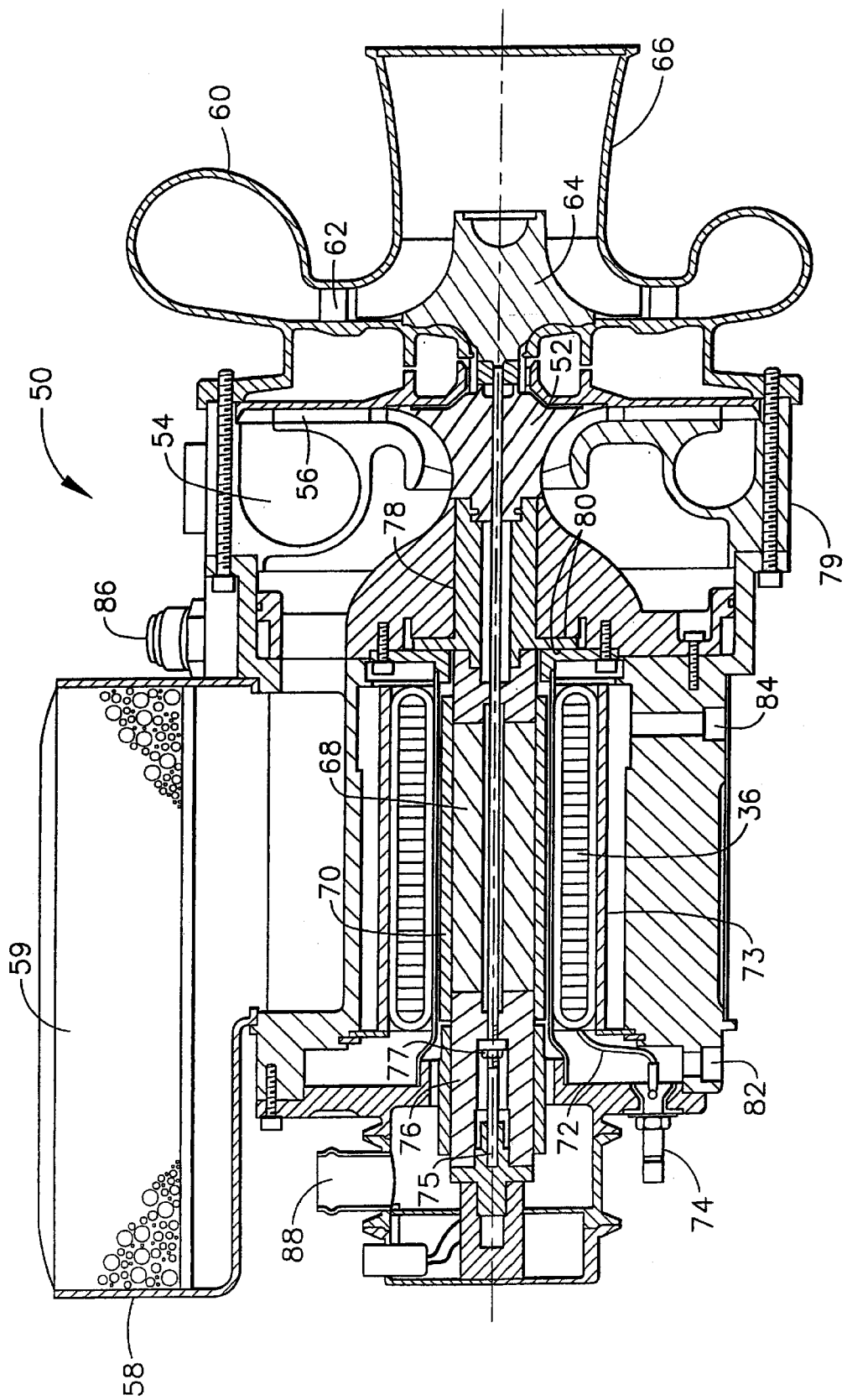
FIG. 2 is a cross-section view of an engine core for the power generating system.

The shaft 18 can be supported by self-pressurized air bearings such as foil bearings. As is shown in FIG. 2, the shaft 18 is supported by journal foil bearings 76 and 78 and thrust foil bearings 80. The foil bearings eliminate the need for a separate bearing lubrication system and reduce the occurrence of maintenance servicing.

Air entering an inlet of the compressor 12 is compressed. Compressed air leaving an outlet of the compressor 12 is circulated through cold side passages 20 in a cold side of a recuperator 22. In the recuperator 22, the compressed air absorbs heat, which enhances combustion. The heated, compressed air leaving the cold side of the recuperator 22 is supplied to a combustor 24.

Fuel is also supplied to the combustor 24. Both gaseous and liquid fuels can be used. In gaseous fuel mode, any suitable gaseous fuel can be used. Choices of fuel include diesel, flare gas, off gas, gasoline, naphtha, propane, JP-8, methane, natural gas and other man-made gases.

The flow of fuel is controlled by a flow control valve 26. The fuel is injected into the combustor 24 by an injection nozzle 28.

Inside the combustor 24 the fuel and compressed air are mixed and ignited by an igniter 27 in an exothermic reaction. In the preferred embodiment, the combustor 24 contains a suitable catalyst capable of combusting the compressed, high temperature, fuel-air mixture at the process conditions. Some known catalysts usable in the combustor 24 include platinum, palladium, as well as metal oxide catalyst with active nickel and cobalt elements.

After combustion, hot, expanding gases resulting from the combustion are directed to an inlet nozzle 30 of the turbine 14. The inlet nozzle 30 has a fixed geometry. The hot, expanding gases resulting from the combustion is expanded through the turbine 14, thereby creating turbine power. The turbine power, in turn, drives the compressor 12 and the electrical generator 16.

Turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the gas exits the recuperator 22. Additional heat recovery stages could be added onto the power generating system 10.

The generator 16 can be a ring-wound, two-pole toothless (TPTL) brushless permanent magnet machine having a permanent magnet rotor 34 and stator windings 36. The turbine power generated by the rotating turbine 14 is used to rotate the rotor 34. The rotor 34 is attached to the shaft 18. When the rotor 34 is rotated by the turbine power, an alternating current is induced in the stator windings 36. Speed of the turbine can be varied in accordance with external energy demands placed on the system 10. Variations in the turbine speed will produce a variation in the frequency of the alternating current (i.e., wild frequencies) generated by the electrical generator 16. Regardless of the frequency of the ac power generated by the electrical generator 16, the ac power can be rectified to dc power by a rectifier 38, and then chopped by a solid-state electronic inverter 40 to produce ac power having a fixed frequency. Accordingly, when less power is required, the turbine speed can be reduced without affecting the frequency of the ac output.

Moreover, reducing the turbine speed reduces the airflow because the compressor runs slower. Consequently, the turbine inlet temperature remains essentially constant, thus maintaining a high efficiency at part load.

Use of the rectifier 38 and the inverter 40 allows for wide flexibility in determining the electric utility service to be provided by the power generating system of the present invention. Because any inverter 40 can be selected, frequency of the ac power can be selected by the consumer. If there is a direct use for ac power at wild frequencies, the rectifier 38 and inverter 40 can be eliminated.

The power generating system 10 can also include a battery 46 for providing additional storage and backup power. When used in combination with the inverter 40, the combination can provide uninterruptible power for hours after generator failure. Additionally, the controller causes the battery 46 to supply a load when a load increase is demanded. The battery 46 can be sized to handle peak load demand on the system 10.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier 38 and the inverter 40 can also be placed in the air stream. After the air has absorbed heat from the aforementioned sources, it is compressed in the compressor 12 and further pre-heated in the recuperator 22.

A controller 42 controls the turbine speed by controlling the amount of fuel flowing to the combustor 24. The controller 42 uses sensor signals generated by a sensor group 44 to determine the external demands upon the power generating system 10. The sensor group 44 could include sensors such as position sensors, turbine speed sensors and various temperature and pressure sensors for measuring operating temperatures and pressures in the system 10. Using the aforementioned sensors, the controller 42 controls both startup and optimal performance during steady state operation. The controller 42 can also determine the state of direct current storage in the battery 46, and adjust operations to maintain conditions of net charge, net drain, and constant charge of the battery.

A switch/starter control 48 can be provided off-skid to start the power generating system 10. Rotation of the compressor 12 can be started by using the generator 16 as a motor. During startup, the switch/starter control 48 supplies an excitation current to the stator windings 36 of the electrical generator 16. Startup power is supplied by the battery 46. In the alternative, a compressed air device could be used to motor the power generating system 10.

Referring to FIG. 2, the "engine core" 50 of the power generating system 10 is shown. The compressor 12 includes an impeller 52 having a bore, a compressor scroll 54 and a diffuser channel 56. Air entering an air inlet 58 is filtered by an air filter 59 and directed to the compressor scroll 54. Air flowing out of the compressor scroll 54 is directed to the recuperator 22.

The turbine 14 includes a turbine scroll 60, a plurality of fixed nozzle vanes 62, and a boreless turbine wheel 64. Hot expanding gases leaving the combustor 24 are directed into the turbine scroll 60 and through the nozzle vanes 62, which redirect the hot expanding gas onto the turbine wheel 64. Turbine exhaust gas leaves the turbine 14 through an exhaust diffuser 66, which reduces the temperature and noise of the turbine exhaust gas.

The rotor 34 of the electrical generator 16 includes magnets 68 made of a rare earth material such as samarium cobalt. The magnets 68 are surrounded by a containment sleeve 70 made of a non-magnetic material such as Inconel 718. The stator windings 36 are housed in a generator housing 73. The rotor 34 has a bore and an optional containment sleeve (not shown) contacting a surface of the bore. Power conductors 72 extend from the stator windings 36 and terminate in a power connector stud 74, which is secured to a base 79. The base 79 provides support for a fuel inlet, the air inlet 58, the compressor 12, the turbine 14, the generator 16, the recuperator 22, the combustor 24, the rectifier 38, and the inverter 40, to enable the system 10 to exist as a packaged unit.

The single shaft 18 is shown in FIG. 2 as a tieshaft 75, which extends through the bores in the rotor 34 and the compressor impeller 52. The tieshaft 75 is thin, having a diameter of approximately 0.25 inches to 0.5 inches. The bores have clearances that allow the tieshaft 75 to extend through the rotor 34 and the impeller 52. However, the tieshaft 75 does not extend through the turbine wheel 64. Instead, the tieshaft 75 is secured to the turbine wheel 64. The tieshaft 75 can be secured to the center of the turbine wheel hub by an inertia weld. Thus, the turbine wheel 64 is boreless in that it does not have a bore through which the tieshaft 75 extends. Eliminating the bore reduces stresses in the turbine wheel 64.

When clamped together by the tieshaft 75, the compressor impeller 52, the turbine wheel 64 and the rotor 34 are rotated as a single unit. Under high operating temperatures and rotational speeds, however, the impeller 52, the turbine wheel 64 and the rotor 34 tend to expand and grow apart and their faces tend to lose contact. Flexing of the tieshaft 75 during operation also tends to separate the faces. To maintain contact between the faces of the impeller 52, the turbine wheel 64 and the rotor 34 at high rotational speeds (60,000 rpm and above), the tieshaft 75 is preloaded. For example, a tieshaft 75 made of Inconel 718 can be preloaded in tension to about 90% of yield strength. During assembly, the tieshaft 75 is preloaded, the impeller 52 and the rotor 34 are slid over the tieshaft 75, and a nut 77 is secured to a threaded end of the tieshaft 75. The tension in the tieshaft 75 is maintained as the nut 77 is turned.

The rotating unit 52, 64, 34 and 75 is supported in a radial direction by inboard and outboard foil journal bearings 76 and 78. The rotating unit 52, 64, 34 and 75 is supported in an axial direction by a foil thrust bearing 80.

Various coolant ports are provided for the engine core 50. Provided are ports 82 and 84 for circulating a coolant over the stator windings 36. Also provided are ports 86 and 88 for circulating a coolant over the foil bearings 76, 78 and 80.

The power generating system 10 can be built in several major modules such as a rotating module, a heat exchanger module, a combustor module, and an electronics module. Each of these modules is relatively lightweight and compact. The modules can be replaced without breaking liquid lines. The use of foil bearings 76, 78 and 80 eliminates the need for an oil-based lubrication system and, therefore, results in low maintenance of the power generating system 10. Scheduled maintenance would consist primarily of replacing the igniter 27, the filter 59 and catalyst elements in the combustor 24.

The power generating system 10 operates on a conventional recuperated Brayton cycle. The Brayton cycle can be operated on a relatively low pressure ratio (e.g., 3.8) to maximize overall efficiency; since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. This high temperature heat addition results in an increased overall cycle efficiency.

The values that follow are provided as an example. Air is compressed in a single stage radial compressor to 3.8 bars. The compressed air can be directed to the recuperator 22 where the temperature of the compressed air is increased using the waste heat from the turbine exhaust gas. The temperature of the exhaust gas from the turbine is limited to about 1,300° F. in order to help extend the life of the recuperator 22. For exhaust gas temperatures above 1,300° F., the recuperator 22 can be made of super alloys instead of stainless steel. The recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 11,900 BTU/kWh on diesel.

After being heated in the recuperator 22, the compressed air is directed to the combustor 24, where additional heat is added to raise the temperature of the compressed air to 1,650° F. A combustor 24 designed according to a conventional design can yield a NOx level of less than 25 ppm, and a combustor 24 using a catalyst can yield a NOx rate that is virtually undetectable (commercial NOx sensors are limited to a 2 to 3 ppm detection range). The high enthalpic gas is then expanded through the turbine 14. The impeller 52, the turbine wheel 64, the rotor 34, and the tieshaft 75—the only moving parts in the engine core 50—spin as a single unit at high speeds of approximately 60,000 rpm or more. The resulting generator output frequency of around 1,200 hertz is then reduced by the inverter 40 to a grid-compatible 50 or 60 cycles. Resulting is a high power density typified by low weight (about a third of the size of a comparable diesel generator) and a small footprint (for example, approximately 3 feet by 5 feet by 6 feet high).

The high power density and low weight of the technology is made possible through the high speed components which permits large amounts of power using a minimum of material. The unit is completely self-contained in a weather proof enclosure. The power generating system 10 is "plug and play", requiring little more than a supply of clean fuel, liquid or gas.

Thus disclosed is a power generating system 10 that can use multiple fuels including natural gas, diesel and JP-8. The power generating system 10 has a low thermal signature and minimal noise generation. The use of air bearings (including foil bearings) eliminates the need for an oil-based lubrication system. The electrical generation system 10 has high reliability and minimal service requirements due to single moving part design. The use of a solid-state electronic inverter allows the system 10 to provide a variable AC output. Installation is easy due to a modular and self contained design, and servicing is easy because the system 10 has one moving part and major parts that are easily accessible. The width, length and height of the engine core 50 can be adjusted to fit a wide variety of dimensional requirements.

The power generating system 10 is smaller, lighter, more fuel-efficient and has lower thermal signature, noise, maintenance and cost penalties than comparable internal combustion engines. Therefore, due to its low installation costs, high efficiency, high reliability and simple, low cost maintenance, the power generating system 10 provides lower operating and fixed costs than power generators of comparable size.

Potential applications for the power generating system 10 are many and diverse. Applications include use in off-grid applications for standalone power, on-grid applications for peak shaving, load following or base load service, emergency back-up and uninterruptible power supply, prime mover applications (e.g., pump, air conditioning) and automotive hybrid vehicles.

The invention is not limited to the specific embodiments disclosed above. For example, the present invention could be configured without the electrical generator 16. Turbine power would be transmitted and applied directly, as in the case of a mechanically driven refrigeration system. Therefore, the present invention is construed according to the claims that follow.

What is claimed is:

1. A microturbine power generating system, comprising:
    a turbine for converting gaseous heat energy into mechanical energy;
    a power converter for converting the mechanical energy produced by the turbine into electrical energy, the power converter having a rotating portion and a non-rotating portion; and
    a single tieshaft having a diameter of less than about one-half inch, the tieshaft connecting the turbine and the rotating portion of the power converter, wherein, during operation of the microturbine power generating system, said tieshaft, turbine and rotating portion of the power converter rotate in unison at speeds of at least about 60,000 rpm.

2. The microturbine power generating system of claim 1 further comprising:
    a combustor for producing gaseous heat energy by igniting an air and fuel mixture;
    a fuel supply for supplying fuel to the combustor; and
    a compressor for compressing intake air and supplying the compressed air to the combustor, the compressor being coupled to the tieshaft and, during operation of the microturbine power generating system, rotating in unison with said tieshaft, turbine and rotating portion of the power converter.

3. The microturbine power generating system of claim 2 wherein the compressor is positioned between the turbine and the power converter.

4. The microturbine power generating system of claim 2, further comprising a recuperator having thermally coupled first and second pathways, the first pathway having an entrance for receiving high temperature compressed air front the compressor and an exit for supplying higher temperature compressed air to the combustor, the second pathway having an entrance for receiving high temperature exhaust air from the turbine and an exit for releasing lower temperature exhaust air.

5. The microturbine power generating system of claim 2, wherein the power converter comprises an electric generator, the electrical generator producing alternating electric current during operation of the microturbine power generating system.

6. The microturbine power generating system of claim 5, wherein the power converter further comprises:
   a rectifier, coupled to the electrical generator, for the rectifying alternating electric current produced by the generator; and
   an inverter, coupled to the rectifier, for accepting direct current from the rectifier and converting the direct current into alternating current of a preselected frequency.

7. The microturbine power generating system of claim 2, wherein the rotating portion of the power converter is a permanent magnet and the non-rotating portion of the power converter is a stator, said permanent magnet being positioned rotatably within said stator and rotating relative thereto during operation of the microturbine power generating system.

8. The microturbine power generating system of claim 2, wherein the fuel is selected from the group consisting of diesel, flare gas, off gas, gasoline, naphtha, propane, JP-8, methane, and natural gas.

9. The microturbine power generating system of claim 2, further comprising a support means for supporting the turbine, the power converter, the compressor, the recuperator and the combustor.

10. The microturbine power generating system of claim 9, wherein the support means comprises a single enclosure having an air inlet and an exhaust outlet, the enclosure surrounding the turbine, the power converter, the compressor, the recuperator and the combustor.

11. The microturbine power generating system of claim 2, wherein the combustor includes a catalyst.

12. The microturbine power generating system of claim 2, further comprising:
   an exhaust passage downstream from the turbine; and
   an air intake passage upstream from the compressor, at least a portion of said air intake passage being orthogonal to said exhaust passage.

13. The microturbine power generating system of claim 3, further comprising:
   an exhaust passage downstream from the turbine; and
   an air intake passage upstream from the compressor, at least a portion of said air intake passage being orthogonal to said exhaust passage.

14. The microturbine power generating system of claim 7 wherein the stator includes a plurality of stator windings and a stator coolant passageway having an exit and an entrance, said stator coolant passageway being thermally coupled to said stator windings, said entrance receiving relatively cool stator cooling fluid and said exit discharging relatively warm stator cooling fluid during operation of the microturbine power generating system.

15. The microturbine power generating system of claim 3, further comprising:
   inboard and outboard foil journal bearings concentric with the tieshaft;
   a foil thrust bearing concentric with the tieshaft and adjacent the rotating portion of the power converter; and
   a bearing coolant passageway having an exit and an entrance, said bearing coolant passageway flowing over said journal bearings and said thrust bearing, wherein, during operation of the microturbine power generating system, said journal bearings support the turbine, compressor and rotating portion of the power converter in a radial direction, said thrust bearing supports the turbine, compressor and rotating portion of the power converter in an axial direction, said entrance receives relatively cool bearing cooling fluid, and said exit discharges relatively warm bearing cooling fluid.

16. The microturbine power generating system of claim 14, further comprising:
   inboard and outboard foil journal bearings concentric with the tieshaft;
   a foil thrust bearing concentric with the tieshaft and adjacent the rotating portion of the power converter; and
   a bearing coolant passageway having an exit and an entrance, said bearing coolant passageway flowing over said journal bearings and said thrust bearing, wherein, during operation of the microturbine power generating system, said journal bearings support the turbine, compressor and rotating portion of the power converter in a radial direction, said thrust bearing supports the turbine, compressor and rotating portion of the power converter in an axial direction, said entrance receives relatively cool bearing cooling fluid, and said exit discharges relatively warm bearing cooling fluid.

17. A method of generating power from high temperature gases comprising the steps of:
   providing a tieshaft having a yield strength, and putting said tieshaft in tension to a predetermined percentage of said yield strength;
   coupling a turbine and a rotating portion of a power converter on the single tieshaft, the turbine, the rotating portion of the power converter, and the tieshaft being rotatable relative to a fixed portion of the power converter;
   expanding the high temperature gases through the turbine, thereby causing the turbine, the rotating portion of the power converter and the tieshaft to rotate at speeds of at least about 60,000 rpm, whereby an electrical current is induced in the power converter.

18. The method of generating power from high temperature gases of claim 17, further comprising the steps of:
   compressing intake air;
   mixing fuel with the compressed intake air in a combustor;
   combusting the mixture to produce high temperature gases comprising combustion products; and
   supplying the combustion products to the turbine.

19. The method of generating power from high temperature gases of claim 18, further comprising the step of combusting the fuel and air to produce the combustion products at least in part in the presence of a catalyst.

20. The method of claim 18, further comprising the steps of:
   after expanding the high temperature gases through the turbine, supplying at least a portion of the heat in the high temperature gases to the intake air.

21. The method of claim 17, wherein the rotating portion of the power converter is a permanent magnet and the fixed portion is a stator, the rotation of the magnet inducing variable frequency alternating current electrical energy in said stator.

22. The method of claim 21, further comprising the step of rectifying the variable frequency alternating current electrical energy to produce direct current electrical energy.

23. The method of claim 22, further comprising the step of inverting the direct current electrical energy to produce an alternating current electrical energy having a predetermined frequency.

* * * * *

UNITED STATES PATENT AND TRADEMARK OFFICE
CERTIFICATE OF CORRECTION

PATENT NO. : 6,198,174 B1
DATED : March 6, 2001
INVENTOR(S) : Nims et al.

It is certified that error appears in the above-identified patent and that said Letters Patent is hereby corrected as shown below:

Column 6,
Line 62, "front" should read -- from --.

Signed and Sealed this

Eleventh Day of December, 2001

Attest:

NICHOLAS P. GODICI
*Attesting Officer*   *Acting Director of the United States Patent and Trademark Office*